March 5, 1963 M. OLESKOW 3,079,943
CONTROL VALVE FOR WATER SOFTENERS
Filed Nov. 7, 1960 2 Sheets-Sheet 1
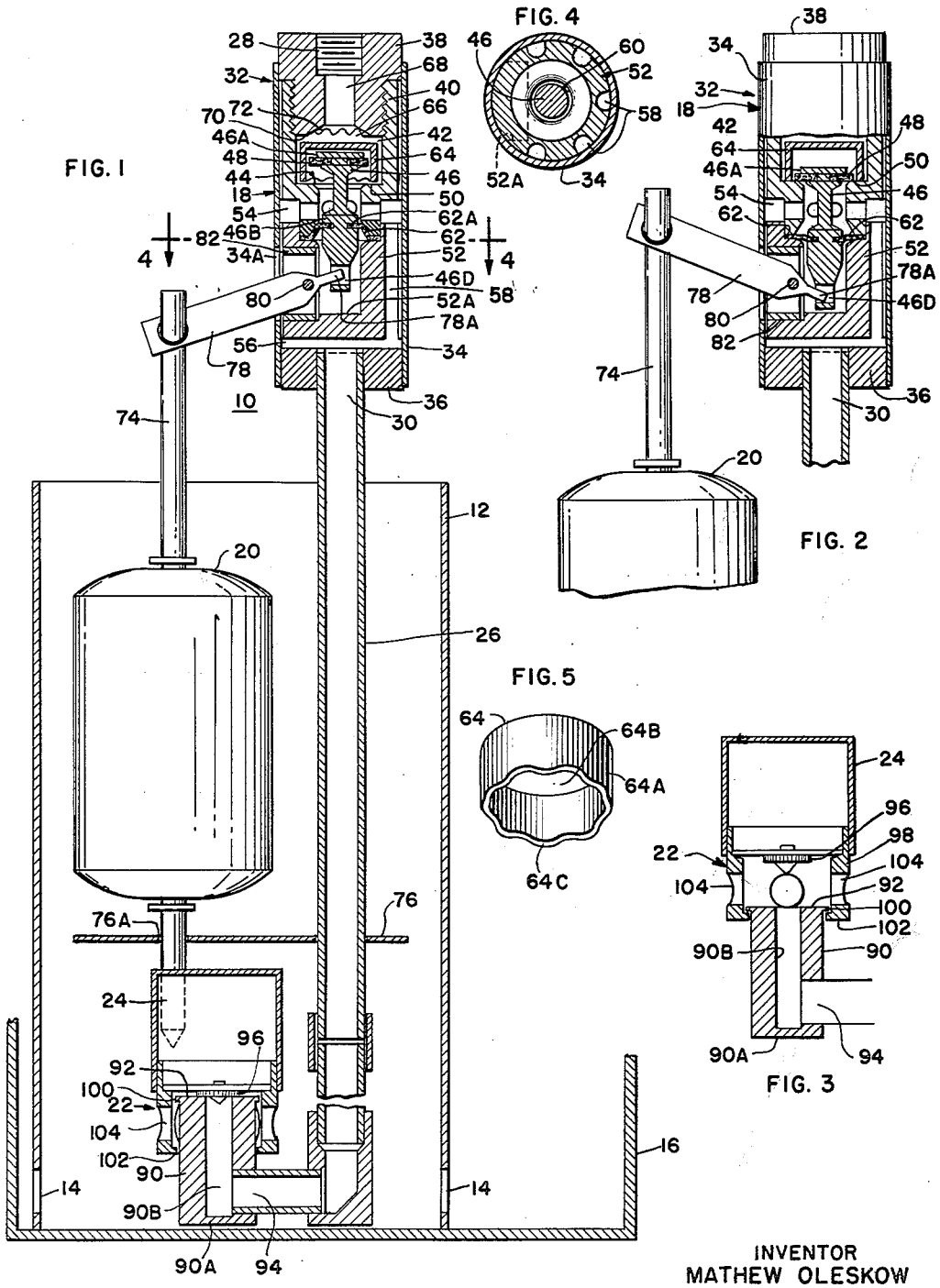
INVENTOR
MATHEW OLESKOW
BY MASON, KOLEHMAINEN,
RATHBURN & WYSS
ATTORNEYS March 5, 1963 M. OLESKOW 3,079,943
CONTROL VALVE FOR WATER SOFTENERS
Filed Nov. 7, 1960 2 Sheets-Sheet 2
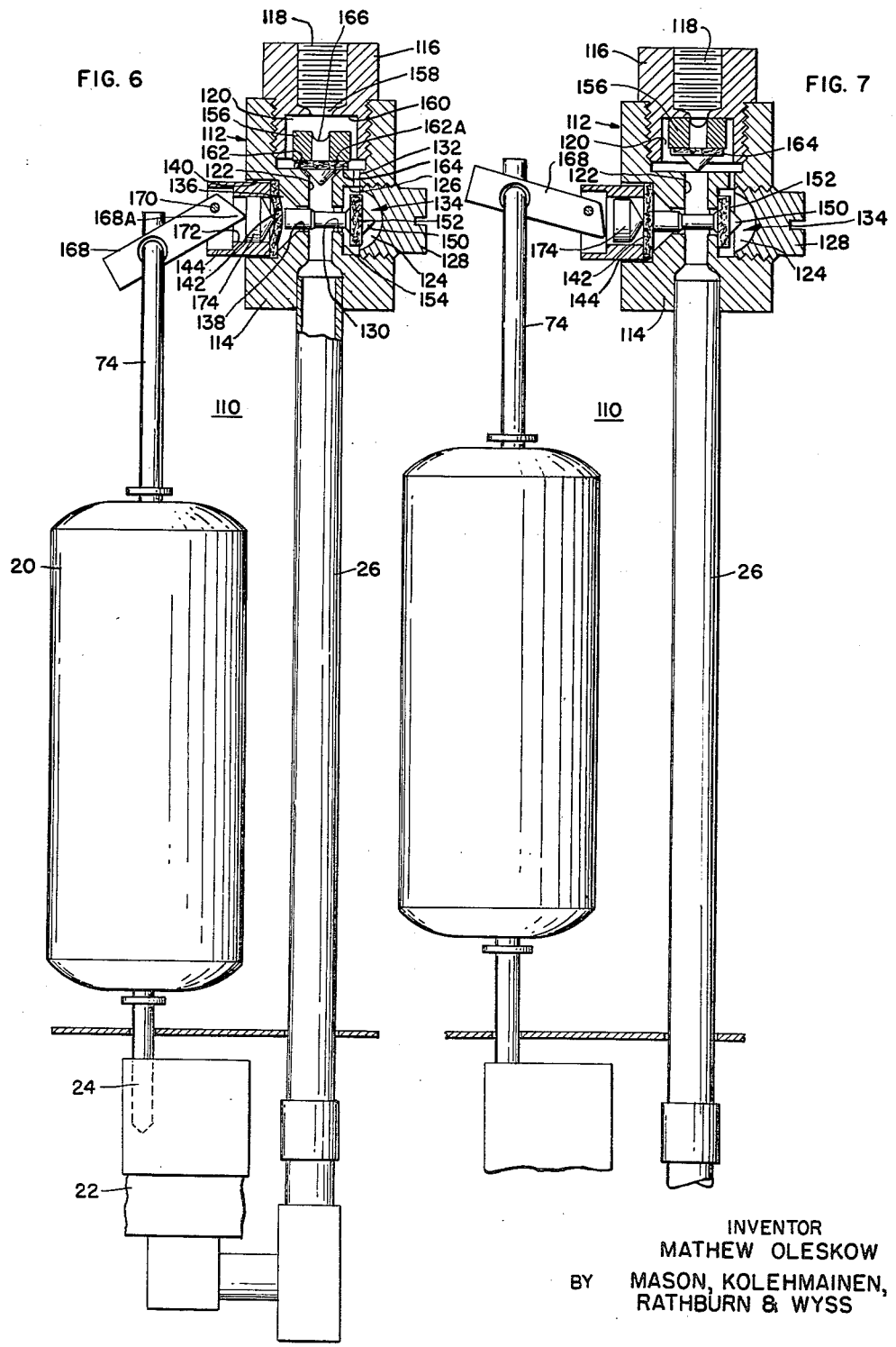
INVENTOR
MATHEW OLESKOW
BY MASON, KOLEHMAINEN,
RATHBURN & WYSS
ATTORNEYS United States Patent Office 3,079,943
Patented Mar. 5, 1963

3,079,943
CONTROL VALVE FOR WATER SOFTENERS
Mathew Oleskow, 5453 Canfield Road, Chicago, Ill.
Filed Nov. 7, 1960, Ser. No. 67,810
5 Claims. (Cl. 137—391)

This invention relates generally to improvements in float valves and is more particularly concerned with improvements in a float valve for use in water softener systems to control the flow of water into and the flow of brine solution out of a regeneration tank during the regeneration of the ion exchange material of the system.

The present invention is an improvement over the valve illustrated and claimed in my copending application, Serial No. 839,203, filed September 10, 1959.

It is accordingly one of the objects of this invention to provide an improved apparatus for controlling the flow of regenerating fluid in a water softening system.

A further and more specific object of the present invention to provide a valve of the character described above wherein, during regeneration, the valve remains fully open to permit flow of brine solution out of the regeneration tank until the level of the fluid in the tank reaches a predetermined low level whereupon the valve closes firmly and positively.

Another object of the present invention is to provide a valve of the type described wherein the valve closes automatically when the level of brine solution in the tank reaches a low level which is, nevertheless, sufficiently high to prevent entry into the valve of debris floating on the solution within the tank.

The invention will best be understood by reference to the following description of illustrative embodiments thereof, when taken together with the accompanying drawings, in which:

FIG. 1 is an elevational view, partly in section, illustrating a valve characterized by the features of the present invention with the valve being shown in one of its operating positions;

FIG. 2 is a partial elevational view of a portion of the valve illustrated in FIG. 1 with the valve being shown in another of its operating positions;

FIG. 3 is a partial elevational view of the valve illustrated in FIG. 1, shown in yet another of its operating positions;

FIG. 4 is a sectional view of the valve of FIG. 1 taken along line 4—4 of FIG. 1, assuming that the entire valve is illustrated in FIG. 1;

FIG. 5 is a perspective view of a restricter element employed in the valve of FIG. 1;

FIG. 6 is an elevational view, partly in section, of yet another embodiment of the valve according to the present invention; and FIG. 7 is a partial elevational view of a portion of the valve illustrated in FIG. 6 with the valve being shown in another of its operating positions.

Briefly stated, according to the present invention, the new and improved apparatus for controlling the flow of liquid into and out of the brine tank of a water softening system during the regeneration of the ion exchange material includes a valve conduit in the tank which communicates at its lower end with the brine solution and which has its upper end adapted to connect to a brine conduit. A main valve is provided in the conduit, and a main float is provided in the tank operatively connected to close the main valve when the float is in a fully raised position and to open the main valve when the float is in a lowered position. In one embodiment of the invention, the main valve is provided with a soft rubber valve element capable of flexing so that, when a vacuum is applied to the top of the apparatus, the suction is sufficient to flex the soft rubber so as to displace its edges away from its cooperating seat sufficiently to permit the brine solution to be withdrawn from the tank even though the main float is in its raised position and the valve is in a closed position. In this manner, the main valve is operative as a check valve to permit brine solution to be withdrawn from the tank whenever a vacuum is applied to the apparatus regardless of the position of the main float. In another embodiment of the invention a check valve assembly bypasses the main valve so that when a vacuum is drawn on the apparatus the check valve is effective to bypass the brine solution around the main valve to provide for withdrawal of the brine solution even though the main float is in a raised position. Of course, once the level of the brine solution begins to lower so that the main float moves downwardly, the main float is effective to open the main valve. Moreover, the main valve is arranged so that the pressure of the incoming water is effective to assist the main float in closing the main valve.

According to another aspect of the invention, the lower end of the conduit is provided with an air check valve assembly consisting of a valve communicating between the conduit and the tank and including an air check valve adapted to be held open when the level of brine solution in the tank is greater than a predetermined selected low level by an auxiliary float or air chamber, and the auxiliary float or air chamber is effective to close the conduit when the brine solution in the tank reaches the predetermined selected low level, whereby air and debris floating in the brine solution is prevented from entering the conduit. Vacuum drawn on the conduit is effective to assist the auxiliary float in maintaining the air check valve in a closed position. Moreover, the pressure of incoming fluid will upseat the valve so that the air check valve assembly offers no restriction to incoming fluid.

Referring now to FIGS. 1 to 5 of the drawings, there is illustrated one embodiment of the new and novel valve apparatus according to the instant invention, generally indicated at 10. The valve apparatus 10 is disposed within a valve chamber 12 which is in communication through a plurality of apertures 14 with the regenerating fluid of the softening system such as brine solution in a brine tank 16. The valve apparatus 10 includes a main valve assembly generally illustrated at 18 and operatively connected to a main float 20. Moreover, the valve apparatus 10 additionally includes an air check valve or valve assembly 22 operatively connected to an auxiliary float or air chamber 24, the main valve 18 communicating with the air check valve 22 through a conduit or extension 26. The main valve 18 is provided with a threaded first or inlet port 28 for connection to external piping (not shown) for connection to the water softening system, as better illustrated in my aforementioned copending application, and with a second or outlet port 30 which is in communication with the conduit 26.

In order to enclose the valve elements, and to prevent water and air leakage around the valve and lever system, the main valve 18 comprises an enclosed housing 32, including a tubular outer jacket 34 enclosed at its lower end with a base plug 36 containing the outlet port 30 and enclosed at its upper end with the valve head or plug 38 which contains the inlet port 28. The valve plug 38 is threadedly engaged in a cup-shaped valve casing 40 so that the valve head 38 and valve casing 40 cooperate to define a valve chamber 42 which is in communication with both of the ports 28 and 30.

In order to regulate the flow through the main valve 18, the valve chamber 42 is provided with a main port 44 in the otherwise closed bottom of the cup-shaped valve casing 40 and which communicates with the outlet port 30. An elongated valve stem 46 extends through the main port 44 and is provided with an enlarged portion 46A at its upper end containing a somewhat disc-shaped valve element 48 of soft rubber or other resilient material and adapted to seat against the inner surface of the valve casing 40 adjacent the main port 44, which surface forms a sort of valve seat 50. The valve stem 46 is adapted to be moved longitudinally through the main port 44 to a check or lowermost closed position wherein the valve element 48 engages the valve seat 50, as best illustrated in FIG. 2, to a second or upper open position wherein the valve element is raised above the valve seat 50 as illustrated in FIG. 1 to provide a valve open position. Although the position of FIG. 2 is referred to as a check or closed position, it is understood that due to the flexible nature of the valve element 48, it will flex so as to displace its edges away from the cooperating seat 50 whenever a vacuum is drawn on the port 28. The main valve 18, however, is closed in this position in the sense that fluid pressure applied to the port 28 will cause the valve element 48 to seat tightly against the valve seat 50 blocking the flow of incoming fluid. In this manner, the main valve 18 functions as a sort of check valve when its valve element 48 is in its lowermost closed position.

In order to provide for movement of the valve stem 46 and at the same time to seal the valve 18 from air and water leakage, there is provided a mounting element 52 within the jacket 34 intermediate and spaced from the casing 40 and the base plug 36 so as to form a first chamber or conduit 54 between the valve casing 40 and the element 52 which communicate with the main port 44, and to form a second chamber or conduit 56 between the element 52 and the base plug 36 which communicate with the conduit 26. Element 52 is fitted within the jacket 34 and is provided with a plurality of bypass channels 58, best illustrated in FIG. 4, running longitudinally at its periphery and which communicate between chambers 54 and 56. The element 52 additionally includes a valve stem guide opening 60 axially aligned below the main port 44 and into which the lower portion of the valve stem 46 extends.

In order to seal the valve stem 46 against leakage of air and water, the lower portion of the valve stem is provided with an enlarged portion 46B in which is sealed the inner edges 62A of a diaphragm seal 62 and the outer edges of the diaphragm seal 62 are clamped or otherwise sealed along the inner surface of the opening 60 thereby forming a flexible seal which provides for the transmission of the longitudinal movement of the valve stem 46 while providing a very positive seal.

In order to control the rate of flow through the valve 18, there is provided the restricter cap 64 within the valve chamber 42 and best illustrated in FIG. 5. The restricter cap 64 is of inverted cup-shape having substantially tubular side walls 64A and a closed bottom 64B. The restricter cap 64 additionally is provided with a plurality of peripheral notches in its lower edge which form restricted flow ports 64C. The valve chamber 42 is additionally provided with a brine flow port 66 communicating with the port 28 through a conduit 68 and forming a valve seat 70 in the valve head 38 which confronts and is vertically spaced from the valve seat 50. The valve seat 70 is also provided with a plurality of notches in its face which form restricted flow passages 72. The restricter cap 64 alternately cooperates with the valve seats 70 and 50 and is adapted to be moved by the flow of solution in the valve 18 between a first position wherein the upper surface of the wall 64B thereof engages against the seat 70 so that when the restricter cap 64 is in this second position the flow through the valve 18 can occur only through the restricted passageway 72, and a second position illustrated in FIG. 1, wherein the lower edge of the restricter cap 64 engages the outer periphery of the valve seat 50 and hence flow through the valve 18 can be accomplished only through the restricter ports 64C.

In order to control the position of the valve 18, the main float 20 is connected to drive the valve elements between the first or closed position illustrated in FIG. 2 and the second or open position illustrated in FIG. 1. Specifically, the float 20 is positioned for vertical movement in response to the level of fluid in the tank 16, the float 20 being secured to a float rod 74 to drive the rod in response to the movement of the float 20. The rod 74, in turn, has its lower end passing through a fixed aperture 76A in a guide 76 which is secured to the conduit 26. The float rod 74 is connected at its upper end to a pivotally mounted lever 78 which is adapted to rock or pivot intermediate its ends about a pin 80 fixedly secured within the valve housing 32. Moreover, the lever 78 passes through an opening 34A in the jacket 34 and an additional opening 52A in the element 52 so that the inner end of the lever 78 extends into the opening 60 of the element 52 and engages the lower end of the valve stem 46 within the opening 60. As illustrated, the lever 78 may be connected to the valve stem 46 by a slip type joint wherein a rodlike portion 78A on the lever 78 extends into an opening or hook portion 46D in the valve stem 46. If desired, a sleeve 82 may be provided in the element 52 to form the opening 52A therein for the reception of the lever 78.

According to a further aspect of the present invention, the lower end of the conduit 26 communicates with the brine tank 16 through an air check valve assembly 22 as illustrated in FIGS. 1 and 3. The air check valve assembly 22 has a valve housing or casing 90 of tubular configuration, closed at the bottom by a wall 90A and open at the top to form a valve seat 92 at its upper edge. The casing 90 is provided with a port 94 which communicates between an inner chamber 90B of the casing 90 and the conduit 26. A valve element 96 is adapted to cooperate with the valve seat 92 so as to control the flow between the chamber 90B and the tank 16.

In order to position the valve element 96, there is provided the auxiliary float or air chamber 24 which supports the valve element 96 at its lower end and which is adapted to move vertically with respect to the valve casing 90 by a sort of telescoping outer casing 98 movable vertically with reference to the casing 90. When the fluid in the tank 16 is above a predetermined low value, the auxiliary float 24 will rise so as to lift the valve element 96 from the valve seat 92, the vertical movement being limited to the engagement of cooperating rise stops 100 and 102 on the casings 90 and 98, respectively. Unobstructed flow then can occur between the chamber 90B and the tank 16 through a plurality of flow ports 104 in the casing 98. However, when the level in the tank 16 reaches the preselected low value, the auxiliary float 24 moves downwardly carrying the valve element 96 into engagement with the valve seat 92 to close the air check valve 22. The valve element 96 is biased against the valve seat 92 only by the weight of the auxiliary float 24 and valve element 96, but suction in the inner chamber 90B will cause the valve element 92 to firmly seat on the valve seat 92; however, fluid pressure in the inner chamber 90B will unseat the valve element 96 permitting the passage of fluid out of the inner chamber 90B. In this manner, the air check valve 22 functions as sort of a check valve when the valve element 96 is in its lower position against the valve seat 92.

From the above-detailed description of the improved valve, the operation of the valve apparatus is believed clear. However, briefly, the operation of the valve apparatus will be described in connection with a typical regenerating water softening system, more fully described in my above-mentioned copending application. A typical water softening installation includes an ion exchange tank containing an ion exchange material or mineral such as an ion exchange resin or a natural or artificial zeolite through which water to be softened is passed. During normal consumer operation, the water is supplied to the softening tank, passes through the ion exchange material in the softening tank, and is then discharged into a utility line for service in the house or other installation. When it is desired to regenerate the ion exchange material by the passage of brine therethrough, the brine solution is withdrawn from the brine tank 16 through the valve apparatus 10 and specifically from the port 28 therefrom. The brine tank 16 is, of course, full of brine solution. A vacuum is drawn on the line connected to the port 28 so as to create a suction in the valve, the vacuum being conveniently drawn by the operation of an ejector (not shown). With the brine tank 16 full, the main float 20 is in its upper or closed position as illustrated in FIG. 2 and the vacuum from the port 28 is exerted in the valve chamber 42. Although the main float 20 is in this upper closed position so as to bias the valve element 48 downwardly against the valve seat 20 to close the main port 44, the valve element 48, being formed of soft rubber, will flex so that the edges thereof are displaced upwardly by the suction away from the main seat 50 sufficiently to permit at least a small quantity of brine solution to be withdrawn around the valve element 48 from the brine tank 16. Such withdrawal of brine solution will, of course, cause the level in the tank to drop so that eventually the float 20 will move downwardly raising the valve element 48 upwardly out of engagement with the seat 50 and opening the main valve 18.

The restricter cap 64 floats freely within the valve chamber 42, being buoyed upwardly during withdrawal of brine solution by its displacement of fluid in the valve chamber 42 against the downward bias of gravity. The restricter cap 64 therefore will be drawn upwardly with the flow of brine solution out of the tank 16 so that the restricter cap 64 seats against the seat 70 in the valve head 38, the outward flow of brine solution then being drawn through the restriction channels 72, the size of the restriction channels 72 controlling the rate of flow of brine solution. During the withdrawal of brine solution from the tank 16, and as long as the fluid in the tank 16 is above the preselected low level, the auxiliary float 24 which is normally submerged is in its uppermost position as illustrated in FIG. 3. In this position the brine solution will be drawn through the openings 104 in the casing 98, through the chamber 90B, port 94, conduit 26, chamber 56, bypass channels 58, chamber 54, port 44, valve chamber 42, restriction channels 72, conduit 68, and through port 28. However, as the level of fluid in the tank 16 lowers to the preselected low level, the auxiliary float 24 will ride on the surface of the solution and the auxiliary float 24 will move downwardly with the level of brine solution until such time that the valve element 96 is lowered against the seat 92 of the air check valve 22. At this position, the air check valve 22 is closed and no further brine solution will be drawn from the tank 16. The suction on the valve apparatus 10 is effective to assist the auxiliary float 24 in holding the valve elements 96 against the valve seat 92.

After the regeneration of the softening tank is complete, the valve apparatus 10 is operative to control the filling of the brine tank 16 with fresh water. The vacuum is removed from the port 28 and inlet water under pressure is supplied to port 28 (in a manner more fully described in my aforementioned copending application). The force of the water is sufficient to move the restricter cap 64 downwardly so that the lower edge thereof engages the seat 50 of the main port 44; however, the main port 44 is not closed off since the inlet flow of water is governed by the restriction openings 64C in the periphery of the restricter cap 64. Inlet water will be introduced through the port 28 and will move through conduit 68, port 70, around the restricter cap 64 through the port 64C thereof, through port 44, into the chamber 54, through the bypass channels 58, into the chambers 56, through the conduit 26, through port 94, into the chamber 90B of the air check valve 22. The pressure of water is then effective to unseat the valve element 96 from the valve seat 92 and water will pass out of the valve chamber 90B through the openings 104 in casing 98 of the air check valve 22. Inlet water will continue to flow through the valve apparatus 10, the upward movement of the auxiliary float being checked by the cooperating rise stops 100 and 102. As the level of fluid in the tank 16 rises, the main float 76 will be buoyed upwardly so as to pivot the lever 78 clockwise about the pin 80 from the position shown in FIG. 1 to the position illustrated in FIG. 2, and the valve stem 46 will move downwardly to seat the valve element 48 against the valve seat 50. The valve element 48 will be held in a closed position against the valve seat 50 by the combined force due to the buoyancy of the float 20 and the pressure of the inlet water above the valve element 48. In this manner, the inlet flow of water into the brine tank 16 will be stopped when the level in the tank 16 reaches the desired height.

Referring now to the embodiment of the improved valve apparatus illustrated in FIGS. 6 and 7, the valve apparatus is generally indicated as 110 and includes a modified main valve 112 operatively connected to a main float 20 by a float rod 74 and additionally including an air check valve 22 operatively connected to an auxiliary float or air chamber 24 and communicating with the main valve 112 through a conduit or extension 26. Except for the modification of the main valve 112, corresponding parts of the embodiment of FIGS. 1 through 5 and FIGS. 6 and 7 are identical and are, therefore, indicated by the same reference numerals. Moreover, as those portions of the valve are similar to that heretofore described in connection with the embodiments of FIGS. 1 through 5, only the main valve 112 is hereinafter described in detail.

According to the embodiment of FIGS. 6 and 7, the main valve 112 has a cylindrical or tubing casing member 114 communicating at its lower end with the conduit 26 and closed at its upper ends by a valve head or plug 116 threadedly engaged in the casing 114. The valve head 116 is provided with an inlet port 118 for connection to external piping (not illustrated) and which communicates at its inner ends with a restriction valve chamber 120 which is formed by an enlarged opening in the valve head 116 and the valve casing 112. A port 122 interconnects the valve chamber 120 and the conduit 26. Moreover, the main valve 112 is provided with a second or main valve chamber 124 formed in the casing 112 by a large counterbore 126 and having its outer ends closed by a plug 128 and communicating at its inner end with the port 122 by means of an auxiliary port 130. The main valve chamber 124 and the restriction valve chamber 120 communicate through a restriction refill passageway 132. The restriction valve chamber 120, the main valve chamber 124, and the passageway 132 therefore forms a valve chamber communicating with the conduit 26 directly through port 122 and indirectly through the auxiliary port 130, and additionally communicating with the port 118 in the valve head 116 of the main valve 112.

In order to provide for opening and closing of the main valve 112, the valve casing 114 is provided with a counterbored opening 136 axially aligned with the main valve chamber 124 and auxiliary port 130 and extending from the outer periphery of the casing 114 radially inward to the port 122. The counterbored opening includes a bearing or guide portion 138 formed of the smaller diameter opening, and a sealing opening 140. A flexible diaphragm 142 of soft rubber or other nonporous material is seated against the bottom of the larger opening 140 and is secured in leakproof relation therewith by a tubular or cylindrical diaphragm seal element 144. In this manner, the casing 114 is provided with a flexible diaphragm 142 which is effective to transfer controlled motions to the valve 112.

In order to provide for opening and closing of the main valve 112, there is positioned a main valve element 150 extending through the auxiliary port 130 and the guide portion 138. The valve stem 150 carries a valve element 152 near its end within the main valve chamber 124 and the valve stem 150 and valve element 152 are adapted to move as a unit between a first position illustrated in FIG. 7 wherein the valve element 152 is seated against the surface of the main valve chamber 124 adjacent the auxiliary port 130 which forms a sort of valve seat 154, to a second position illustrated in FIG. 6 wherein the valve element 152 has been moved out of engagement with the valve seat 154.

In order to provide for a controlled flow of brine solution out of the brine tank 16, the restriction valve chamber 120 is provided with a restricted check valve assembly 156 and the valve chamber 120 additionally includes a port 158 forming the communicating means between the port 118 and the chamber 120 and whose edges form a sort of valve seat 160, and a second confronting, vertically spaced valve seat 162 formed in the casing 114 by the port 122. If desired, the valve seat 162 may include a beveled portion 162A. The lower end of the restricter check assembly is provided with a valve element 164 of rubber or other material which serves as a gasket and the upper end of the restricted check assembly 156 is provided with a plurality of radial notches 166. The restriction check assembly 156 cooperates alternately with the valve seats 162 and 160 and the outward flow fluid in the valve assembly 112, and is biased downwardly only by the force of gravity so that the assembly 156 is movable between a first or upper position illustrated in FIG. 7 wherein the upper surface of the assembly 156 is against the seat 160 and the port 158 then communicates with the chamber 120 only through the restricted passageways 166, to a second position illustrated in FIG. 6 wherein the restricter check assembly 156 is in its downward or lowered position with the valve element 164 engaging the valve seat 162 closing off the restriction valve chamber 120 from the port 122.

In order to move the valve stem 150 from its first position illustrated in FIG. 7 to its second position illustrated in FIG. 6, the main float rod 74 is connected at its upper end to an operating lever 168 which is pivoted about the pin 170 fixedly secured to the element 144. The lever 168 is pivoted above its longitudinal axis and is provided with an oblique end so that there is effectively provided an operating arm 168A positioned within the hollow interior of the element 144. The element 144 is provided with a hollow guide portion 172 in which is positioned a valve plunger 174 of generally cylindrical shape and having one end conical and adapted for engaging the seal member 142. The other end of the valve plunger 174 is adapted to be engaged by arm 168A of lever 168 for movement from the closed or check position illustrated in FIG. 7 to a second or valve open position illustrated in FIG. 6. Although the main valve 112 is referred to as having a closed or check position, it is understood that whenever a vacuum is drawn on the port 118, the suction will raise the restriction check assembly 156 and will also tend to unseat the valve element 152 to open the valve 112 for the withdrawal of brine solution; however, the valve 112 is closed in the sense that fluid pressure applied to the port 118 will cause the restriction check assembly 156 to engage the valve seat 162. When the valve 118 is in the valve closed position illustrated in FIG. 7, such fluid pressure will additionally cause the valve element 152 to firmly seal against the valve seat 154 blocking the flow of incoming fluid. In this manner the main valve 118 functions as a sort of check valve when in the valve closed position as illustrated in FIG. 7.

From the above description, the operation of the modified main valve 112 is believed to be clear. However, briefly, its operation will be herein described. At the initiation of a regeneration cycle, the level of fluid in the brine tank is high and the main float 20 is in its upper position illustrated in FIG. 7. In this position the arm 168A has been rotated out of engagement with the valve plunger 174 and the prior pressure of water to the port 118 has been effective to seat the restricted check assembly 156 against the lower valve seat 162 in the restriction valve chamber 120 and has likewise been effective to seat the valve element 152 against the seat 154 in the main valve chamber 124. However, immediately upon application of a vacuum to port 118, the vacuum is effective to lift the restriction check assembly 156 upwardly unseating the valve element 164 from the valve seat 162 and raising the restriction check assembly 156 against the upper seat 160 in the valve chamber 120. In this position brine solution will be drawn from the conduit 26 through the port 122 into the restriction valve chamber 120 and through the restriction opening 166 through the port 158 and into the external piping connections (not shown). Simultaneously, a vacuum will be drawn in the main valve chamber 124 through the restricted opening 132 and the main valve stem 150 and valve element 152 will be unseated from the valve seat 154, moving the valve stem 150 from the position illustrated in FIG. 7 to the position illustrated in FIG. 6. Some brine solution will then tend to flow through the parallel path from the conduit 26 into the port 122, through the auxiliary port 130 into the main valve chamber 124, through the restriction conduit 132 into the restriction valve chamber 120 and through the restriction conduit 166 into the port 158 and then into the external piping (not shown). As brine solution is withdrawn the level of the solution in the tank drops and the main float 20 moves downwardly so that the arm 158A of the lever 168 bears against the valve plunger 174, moving the valve plunger 174 to the right as viewed in FIGS. 6 and 7. This motion of the valve plunger 174 is transmitted through the air seal 142 to the valve stem 150, thereby positively holding the valve element 152 in the unseated position. As heretofore described, the air check valve 22 is held open by the auxiliary float 24 until such time as the level in the brine tank reaches a predetermined low value so that the auxiliary float 24 will then ride upon the surface of the brine solution and further lowering of the level of the brine solution will close the air check valve 22, stopping further withdrawal of brine solution from the tank 16.

After the completion of the regeneration, the suction is removed from the port 118 and inlet water under pressure is applied thereto. At this time, the valve 110 assumes the position illustrated in FIG. 6 with the valve element 152 held from engagement with the valve seat 154 through the integral operation of the valve stem 150 with the valve plunger 174 and the arm 168A of lever 168. Simultaneously, the restriction check assembly 156 is moved downwardly by the weight of gravity and under the force of the incoming water so that the valve element 164 seats against the valve seat 162 in the restriction valve chamber 120, thereby blocking flow of incoming fluid between the restriction valve chamber 120 and the port 122. Water can now enter the conduit 26 only through the restriction conduit 132, the incoming water passing through the port 158 into the restriction valve chamber 120, then passing to the main valve chamber 124 through the communicating restriction conduit 132 and then around the valve stem 150 through the auxiliary port 130 into the port 122 and into the conduit 26. As heretofore described, the pressure of the incoming water is effective to unseat the air check valve 22 to open the valve and the tank will fill with water. As the tank is filled with water, the main float 20 will move upwardly, pivoting the arm 158A of the lever 168 out of engagement with the valve plunger 174. The force of the incoming water is then effective to move the valve element 152 against the valve seat 154 to close the main valve 112 and to shut off the supply of incoming water.

While preferred embodiments of the invention have been described by way of illustration, many modifications will occur to those skilled in the art. Therefore, it is to be understood that it is intended in the appended claims to cover all such modifications as fall within the true spirit and scope of the invention.

What is claimed as new and is desired to be secured by Letters Patent of the United States is:

1. Apparatus for controlling the flow of solution into and out of a brine tank during the regeneration of the ion exchange material of a water softening system, said apparatus comprising conduit means for positioning in said tank communicating with the brine solution in said tank, a valve chamber communicating with said conduit means, a pair of confronting valve seats in said chamber, a first valve member cooperatively associated to seat against one of said valve seats, a first float connected to move said valve member away from said one of said seats when said float is in a lowered position, a restriction check valve member in said chamber adapted to seat alternately against said valve seats in response to the direction of flow in said chamber and effecting a restricted passage for said flow.

2. Apparatus as set forth in claim 1 above and additionally including an air check valve in said conduit means and a second float means for positioning in said tank connected to close said air check valve when the fluid in the tank reaches a preselected low level.

3. Apparatus as described in claim 1 above wherein the other of said valve seats is provided with at least one restricted passageway communicating between said chamber and said conduit means when said restricted check valve member is seated thereagainst; and wherein said restricted check valve member comprises a generally cup-shaped member having a wall portion, said wall portion being provided with at least one port communicating between the inside and outside of said cup-shaped member and in communication with the open edge of said cup-shaped member, said cup-shaped member being positioned within said chamber so that said open edge is adapted to seat on said one of said valve seats.

4. Apparatus as described in claim 2 above wherein said air check valve comprises an inverted cup-shaped member having at least one port defined in the side wall thereof, a tubular member having an upward opening and slidably engaging the walls of said cup-shaped member and in communication with said conduit, stop means operatively associated with both of said members for preventing disengagement of said members, float means secured to said cup-shaped member for slidably raising said member relative to said tubular member in response to the fluid level in said tank, and valve means carried by said cup-shaped member and operatively positioned to close said upward opening when said cup-shaped member is in a lowered position.

5. Apparatus for controlling the flow of fluid into and out of a brine tank, said apparatus comprising conduit means communicating with the fluid in said tank, a first valve means in said conduit means for positioning above the level of said fluid in said tank movable between a check position providing for a flow of fluid out of the tank and preventing flow in an opposite direction and an open position, first float means for positioning in said tank and responsive to the level of fluid therein connected to move said first valve means to said open position when said first float means is in a lowered position and to said check position when in a raised position, said first valve means including a pair of conduits connected in parallel, each having a valve seat, a first valve member movable to seat against one of said seats and to move away from said one seat when said fluid is flowing out of said tank, and a second valve member movable to seat against the other of said seats and to move away from said other seat when said fluid is flowing into said tank, said first float means connected to move said second valve member away from said other seat when said valve means is in said open position, both of said valve members being biased against their respective seats when fluid under pressure is applied to said valve means, second valve means in a position of said conduit means for positioning in said tank and movable between an open position and a check position preventing flow of fluid out of the tank while permitting flow in the opposite direction, and a second float means for positioning in said tank and responsive to the fluid level therein connected to said second valve means for moving it to its check position when the fluid level in said tank reaches a preselected level and to hold said second valve means in its open position when said fluid is above said preselected level.

References Cited in the file of this patent

UNITED STATES PATENTS

| | | |
|---|---|---|
| 1,851,927 | McCord | Mar. 29, 1932 |
| 2,716,422 | Whitlock | Aug. 30, 1955 |
| 2,935,081 | Kryzer | May 3, 1960 |
| 2,985,423 | Tischler | May 23, 1961 |